United States Patent [19]
Chuang

[11] Patent Number: 6,082,684
[45] Date of Patent: Jul. 4, 2000

[54] SLIDABLE HAND PROTECTOR

[76] Inventor: Chao-Fu Chuang, P.O. Box 82-144, Taipei, Taiwan

[21] Appl. No.: 09/139,576

[22] Filed: Aug. 25, 1998

[51] Int. Cl.[7] .................................................. B43L 15/00
[52] U.S. Cl. ........................................ 248/118.5; 248/918
[58] Field of Search ........................... 248/118.5, 118.1, 248/118, 918, 205.2, 349.1; 400/715; 434/166; 15/437; 623/65; 128/877, 878

[56] References Cited

U.S. PATENT DOCUMENTS

| | | | |
|---|---|---|---|
| 235,581 | 12/1880 | Smith | 248/118.5 |
| 709,114 | 9/1902 | Rockwell | 248/118.5 |
| 1,308,355 | 7/1919 | Ruyter et al. | 248/118.1 |
| 1,510,877 | 10/1924 | Wiedenmann | 248/118.5 |
| 1,522,652 | 1/1925 | Setrakian | 248/118.5 |
| 1,627,635 | 5/1927 | Craig | 248/118.5 |
| 3,256,880 | 6/1966 | Caypinar | 128/877 |
| 3,295,518 | 1/1967 | Hazlewood et al. | 128/877 |
| 3,390,477 | 7/1968 | Galbraith | 42/94 |
| 5,025,801 | 6/1991 | Callaway | 128/877 |
| 5,335,888 | 8/1994 | Thomsen | 248/118.5 |
| 5,439,192 | 8/1995 | King | 248/118 |
| 5,472,161 | 12/1995 | Krukovsky | 248/118.5 |
| 5,762,302 | 6/1998 | Myers | 248/118.5 |
| 5,887,839 | 3/1999 | Smith et al. | 248/452 |

FOREIGN PATENT DOCUMENTS

| | | | |
|---|---|---|---|
| 25045 | 11/1895 | United Kingdom | 248/118.5 |

*Primary Examiner*—Anita M. King
*Attorney, Agent, or Firm*—A & J

[57] ABSTRACT

A slidable hand protector includes a U-shaped body portion having two upwardly extending walls at two opposite sides thereof and a recess formed between the two upwardly extending walls, and a plurality of bearings provided on a bottom of the U-shaped body portion, whereby one can put his hand in the recess of the U-shaped body portion and slide the hand on a desk top without being injured.

2 Claims, 3 Drawing Sheets

SLIDABLE HAND PROTECTOR

BACKGROUND OF THE INVENTION

1. Field of the Invention

This invention is related to a slidable hand protector.

2. Description of the Prior Art

The mouse has become the most popular pointing device for the newest breed of operating environments-graphic interfaces represented by Windows, the Macintosh, and OS/2. With the mouse, a user can control his personal computer by pointing images instead of typing in commands. However, the mouse must be moved by dragging it across a flat surface in operation. During recent years, evidence of mouse related illnesses has surfaced and an increasing number of health complaints have been reported.

Therefore, it is an object of the present invention to provide a slidable hand protector which can obviate and mitigate the above-noted drawbacks.

SUMMARY OF THE INVENTION

This invention is related to a slidable hand protector.

According to a preferred embodiment of the present invention, a slidable hand protector includes a U-shaped body portion having two upwardly extending walls at two opposite sides thereof and a recess formed between the two upwardly extending walls, and a plurality of bearings provided on a bottom of the U-shaped body portion, whereby one can put his hand in the recess of the U-shaped body portion and slide the hand on a desk top without making calloused skin.

It is the primary object of the present invention to provide a slidable hand protector which enables a user's hand to slide freely on a desk top.

It is another object of the present invention to provide a slidable hand protector which can protect a user's hand from being injured.

It is still another object of the present invention to provide a slidable hand protector which is fit for practical use.

It is still another object of the present invention to provide a slidable hand protector which is low in cost.

It is a further object of the present invention to provide a slidable hand protector which is simple in construction.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
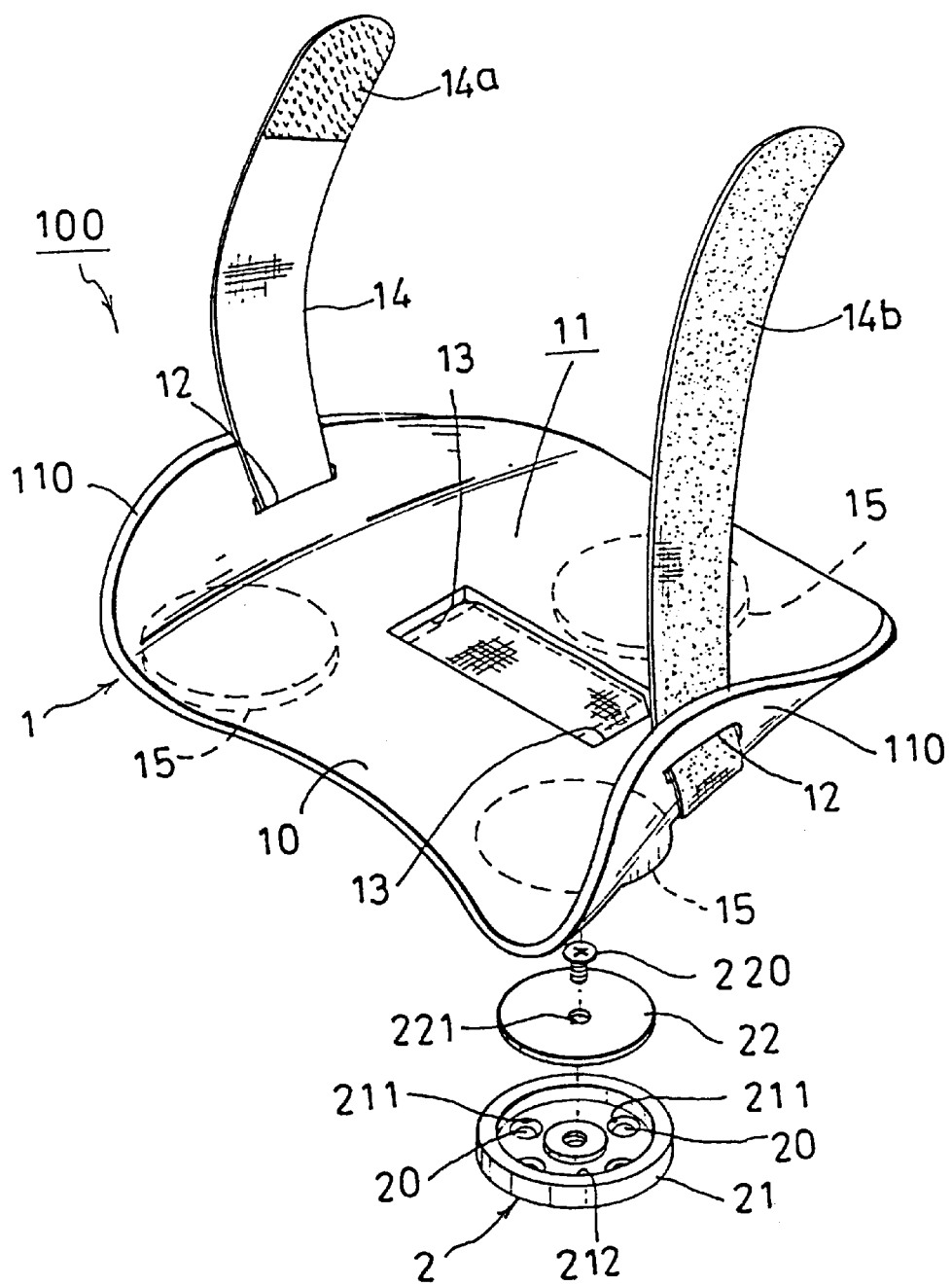
FIG. 1 is an exploded view of a slidable hand protector according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
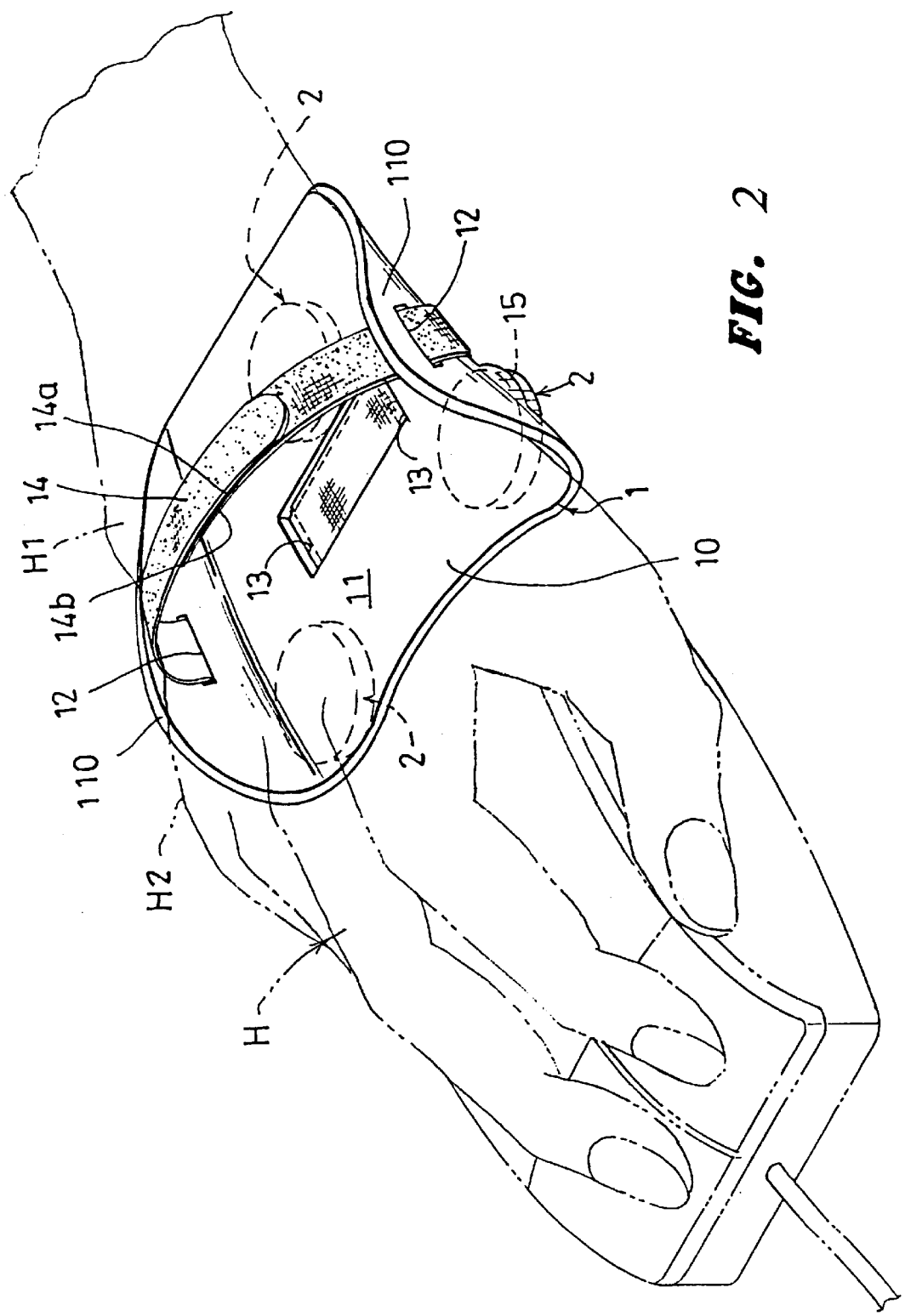
FIG. 2 is a working view of the present invention.

With reference to the drawings and in particular to FIGS. 1 and 2 thereof, the slidable hand protector 100 according to the present invention comprises a U-shaped body portion 1 formed with a recess 11 at the top 10 adapted to receive one's wrist H1 and heel H2. A plurality of bearings 2 are mounted on the bottom of the U-shaped portion 1 and provided with a plurality of balls 20 so that the U-shaped body portion 1 can be freely moved on a desk top to enable one's hand H to operate a keyboard, mouse or the like thereby preventing the wrist H1 and heel H2 from rubbing the desk top and therefore protecting them from being injured.

Referring to FIGS. 1 and 2, the U-shaped body portion 1 is preferably made of plastic and formed with two upwardly extending walls 110 at two opposite sides thereby defining a recess 11 adapted for receiving one's wrists H1 and heel H2. Each of the upwardly extending walls 110 has a slit 12 and the recess 11 is formed with two slits 13 so that a strap 14 can engage with the U-shaped body portion with its two ends extending out of the two slits 12 of the two upwardly extending walls 110. The strap 14 has one end 14a provided with tiny hooks and another end 14b with an adhesive pile.

As shown in FIG. 2, the two ends 14a and 14b of the strap 14 can be pressed together to keep one's hand H steadily within the recess 11 of the U-shaped body portion 1. The bottom of the U-shaped body portion 1 has a plurality of cavities 15 each adapted to receive a bearing 2.

Figure 3:
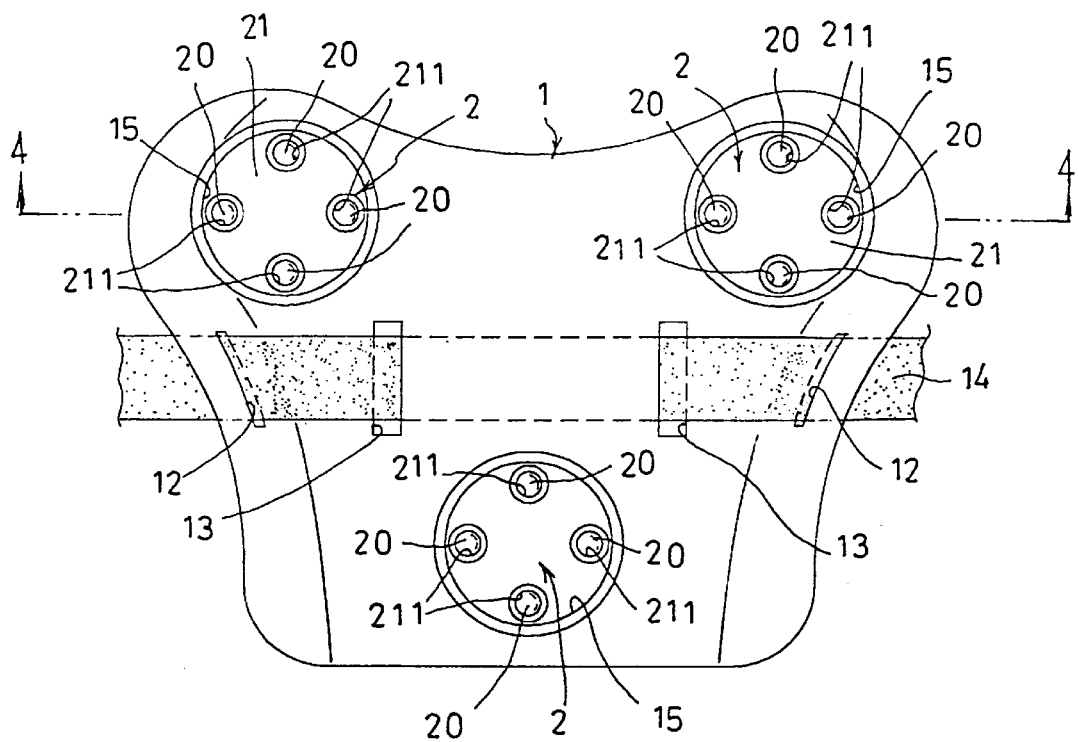
FIG. 3 is a bottom plan view of the present invention.
Figure 4:
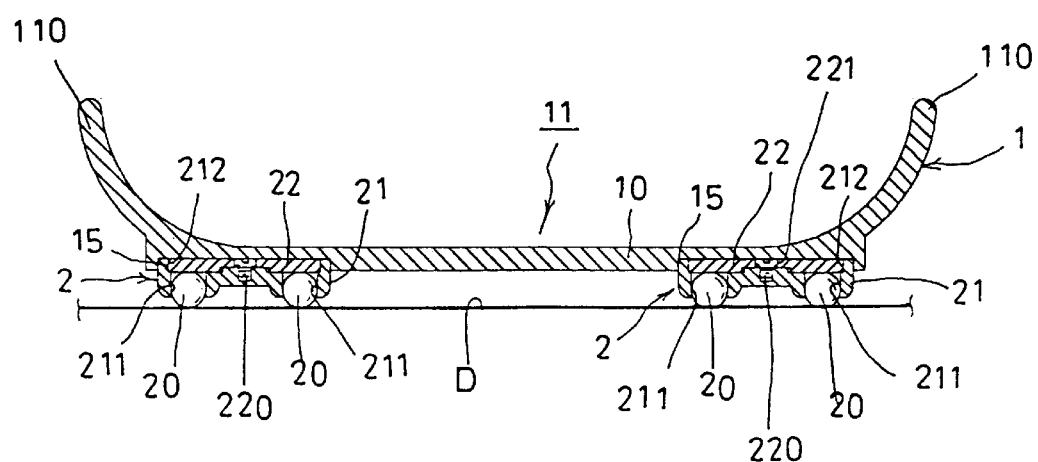
FIG. 4 is a sectional view of the present invention, taken along line 4—4 of FIG. 3.

Turning now to FIGS. 1, 3 and 4, the bearing 2 includes a cage 21, a plurality of balls 20, a circular cover 22, and a screw 220. The cage is dimensioned to fit into a cavity 15. The cage 21 is formed with a plurality of conical through holes 211 with a large diameter at the top and a small diameter at the bottom. Within each of the conical through holes 211 is fitted a ball 20 which has a diameter smaller than the large diameter but larger the small diameter of the conical through hole 211, so that the ball 20 will partially protrude out of the conical through hole 211. The top of the cage 21 has a circular recess 212 in which is fitted the circular cover 22 for preventing the balls 20 from getting out of the cage 21 and ensuring the balls 20 to protrude partially downwardly out of the cage 21.

The circular cover 22 is fixedly mounted in the cage 21 by the screw 220 extending through the center ball 221 thereof, or otherwise secured thereto by any suitable means.

When in use, the wrist H1 and heel H2 of the hand H is first disposed into the recess 11 of the U-shaped body portion 1 and then tied in place by pressing together the two ends 14a and 14b of the strap 14. As a consequence, when the hand H is moved, the U-shaped body portion 1 will slide smoothly on the desk top thereby preventing the hand H from rubbing the desk top and protecting it from being injured.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A slidable hand protector comprising:

a U-shaped body portion having two upwardly extending walls at two opposite sides thereof and a recess formed between said two upwardly extending walls;

a plurality of bearings provided on a bottom of said U-shaped body portion, said bearing including a circular cage mounted on said bottom of said U-shaped body portion and formed with a plurality of conical through holes, a plurality of balls each fitted into one of said conical through holes, and a circular cover fitted in a top of said circular cage, said circular cover being fixedly mounted on said circular cage by a screw; and a strap extending through slits at said upwardly extending walls and said U-shaped body portion, said U-shaped body portion having a bottom formed with a plurality of cavities in each of which is fitted a respective one of said bearings;

whereby one can put his hand in said recess of said U-shaped body portion and slide the hand on a desk top without being injured.

2. The slidable hand protector as claimed in claim 1, wherein said strap has one end provided with tiny hooks and another end provided with an adhesive pile engageable with said tiny hooks.

\* \* \* \* \*